United States Patent [19]
Fordyce

[11] 3,758,088
[45] Sept. 11, 1973

[54] HYPERBOLIC CROSS FLOW COOLING TOWER WITH BASINS AND FILL INTEGRATED INTO SHELL

[75] Inventor: Homer E. Fordyce, Kansas City, Mo.
[73] Assignee: The Marley Company, Johnson County, Kans.
[22] Filed: Dec. 10, 1971
[21] Appl. No.: 206,843

Related U.S. Application Data
[63] Continuation-in-part of Ser. No. 857,134, Sept. 11, 1969.

[52] U.S. Cl. ............................ 261/111, 261/DIG. 11
[51] Int. Cl. .............................................. B01f 3/04
[58] Field of Search ........................... 261/108–112, DIG. 11

[56] References Cited
UNITED STATES PATENTS

| | | | |
|---|---|---|---|
| 821,561 | 5/1906 | Wheeler et al. | 261/DIG. 11 |
| 2,512,271 | 6/1950 | Green | 261/111 |
| 3,115,534 | 12/1963 | Bottner | 261/110 |
| 3,322,409 | 5/1967 | Reed | 261/DIG. 11 |
| 3,333,835 | 8/1967 | DeFlon | 261/DIG. 11 |
| 3,389,895 | 6/1968 | DeFlon | 261/DIG. 11 |
| 3,411,758 | 11/1968 | Edmondson | 261/DIG. 11 |

Primary Examiner—Tim R. Miles
Assistant Examiner—Steven H. Markowitz
Attorney—Schmidt et al.

[57] ABSTRACT

A fireproof, hyperbolic, natural draft, crossflow water cooling tower having two story fill assembly structure between respective concrete hot water distribution and cold water basins within the tower shell and integral therewith adjacent the air inlet of the shell. Stainless steel fill and eliminator supports suspended from the distribution and basin units carry transversely three-quarter wave asbestos cement board fill members and transversely full wave eliminator bars respectively cut from corrugated sheets. The fill members are disposed on edge with the longitudinal length thereof generally parallel to the air flow through each fill assembly structure while the eliminator bars lie in flat, generally horizontal disposition with the longitudinal axes thereof tilted for drainage of the bars and located perpendicular to the path of travel of air through respective fill assembly structures.

10 Claims, 10 Drawing Figures

HYPERBOLIC CROSS FLOW COOLING TOWER WITH BASINS AND FILL INTEGRATED INTO SHELL

This is a continuation-in-part of my copending application Ser. No. 857,134, filed Sept. 11, 1969, and entitled "HYPERBOLIC CROSS FLOW COOLING TOWER WITH BASINS AND FILL INTEGRATED INTO SHELL".

This invention relates to water cooling towers and particularly to a fireproof, hyperbolic, natural draft, crossflow water cooling tower wherein the fill structures are disposed within the tower shell between hot water distribution and cold water basin units integral with the tower shell. By virtue of the unique integration of the basins and fill into the tower shell, stacked, two story fill assembly structure may be provided adjacent the air inlet of the shell with the annular hot and cold water basins thereof performing the functions of supplying hot water to corresponding fill assemblies and collecting the cold water gravitating therefrom, as well as reinforcing the bottom section of the hyperbolic shell to make possible construction of larger towers than heretofore fabricated without necessarily providing a corresponding increase in the structural strength of the tower shell itself adjacent the bottom portion thereof.

Water cooling towers provided with hyperbolic, natural draft stacks to induce flow of air through the fill assembly of the tower have been employed for many years, particularly in European countries where power costs have remained relatively high, by virtue of the fact that operating expenses made the cost of the shell feasible from an overall economic standpoint. Hyperbolic, natural draft cooling towers have only recently found a significant place in the domestic market. Tower costs have for the most part made mechanical induced draft towers the most efficient and practical from an overall cost standpoint for most industrial applications. Recent trends in power plants though have changed the cost and feasibility standards in that the extremely large power plants now being constructed or contemplated require volumes of cold water for cooling purposes many times that heretofore needed for these applications. Hyperbolic, natural draft cooling towers have been found to be commercially competitive and attractive for large power plants where hundreds of thousands of gallons of water must be handled per hour. As power plant design has gone above the 1,000 megawatt level, the required size of the hyperbolic towers needed for plants of these capacities has further expanded.

Most of the early hyperbolic, natural draft cooling towers and especially those built in Europe were of counterflow design. In this type of unit, the fill assembly structure was located within the lower part of the tower shell in disposition such that water sprayed downwardly onto intersecting, vertically spaced grids, gravitated toward the cold water basin in counterflow relationship to air pulled in around the perimeter of the tower and then caused to move upwardly toward the outlet of the shell by the natural draft induced by the relatively high height of the tower. However, a crossflow cooling tower can handle more air for a given shell size than the counterflow concept. This is attributable to the lower resistance to air flow through the fill assembly of a crossflow tower as compared with air resistance encountered in a counterflow tower. As a consequence, crossflow towers are less expensive for handling the same volume of hot water. The increased cost of a counterflow design is in part traceable to the fact that in a counterflow tower it is necessary to provide space under the fill assembly for air to come in from the outside for distribution across the bottom of the fill. The fill assembly must therefore be positioned a substantial distance above ground level to permit air to enter the tower above the cold water basin and then flow upwardly through the fill grids or racks. Very little water cooling takes place in this plenum area below the fill assembly in a counterflow tower. Since in a counterflow design the water is falling vertically while the air flow is in direct opposition thereto, it is to be appreciated that the falling water has a tendency to create much greater resistance to the flowing air than is the case in a crossflow design wherein the air is flowing at essentially a 90° angle with respect to the falling water.

Furthermore, the extra space which must be provided under a counterflow fill in many cases necessitates a higher pumping head than with a crossflow design and in hyperbolic, natural draft cooling towers of large capacity, the pumping head is proportionately increased.

Although the initial hyperbolic, natural draft cooling towers were of counterflow design as noted, more recent hyperbolic towers have been constructed in crossflow form because of the greater efficiency in comparison with the cost thereof over the counterflow type. In this instance, the fill assembly structure has been located around the perimeter of the tower shell with the tower thereby serving to induce crossflow movement of air through the annular fill structure surrounding the tower thus obviating the necessity of providing mechanical means for moving air through the fill structure.

The water volumes required for high megawatt power plants now under construction or being planned necessitate very large towers which for example may be 500 feet or higher in height and have a corresponding large diameter at the base. In view of the desirability of having from 800 to 1,000 feet per minute air discharge velocity from the shell to cool water with maximum efficiency, it has heretofore been found necessary in crossflow towers to position the fill assembly structure outside of the shell around the perimeter thereof with an annular hot water distributor being located in overlying relationship to a cold water collection basin beneath the annular fill. Because water tends to move inwardly in the direction of air flow during gravitation through the fill, the hot water basin normally has been of a greater diameter than the cold water collection basin to provide compensation for this natural drawback of the water. As a result, the hot water basin has been located some distance from the proximal peripheral surface of the tower shell. The annular space left between the hot water basin and the shell has in part been occasioned by the hyperbolic configuration of the tower shell itself. In order to close the annular space between the inner edge of the hot water distributor and the tower shell, it has been necessary to provide an annular, frustoconical canopy between the tower shell and the hot water basin to prevent flow of air into the interior of the tower other than through the fill structure inlet. As the size of the hyperbolic tower is increased though, the annular canopy between the shell and hot water basin must be increased to a point where it is no longer economically feasible to provide a shroud of a size sufficient to close the annular space and also withstand snow and wind loads thereon.

Furthermore, the fill structure employed in crossflow water cooling towers including hyperbolic, natural draft towers has for the most part been of conventional wood slat construction with the hot water distributor also being fabricated of wood because of its good corrosion resistance characteristics. Only the cold water collection basin has been of concrete fabrication. As a result, a considerable fire hazard has been presented by the wooden hot water distributor and fill units particularly in those instances where at least a part of the fill is not loaded with water, as for example in cold weather operation wherein a larger proportion of hot water may be directed to one side of the tower to prevent icing thereof or where adequate cooling of the water is obtained under operating conditions where water is not passed over the entire circumferentially extending area of the fill assembly.

The primary object of the present invention is to provide a crossflow, hyperbolic, natural draft cooling tower wherein two story basin and fill assembly structure is integrated into the shell to significantly increase the water cooling capacity of the tower without enlarging the space taken up by the tower while at the same time providing completely fireproof construction.

A further important object of the invention is to provide a hyperbolic, natural draft, crossflow cooling tower with basins and fill integrated into the shell of the tower wherein the two story fill is disposed in two annular stacked layers for maximum efficiency without increasing the overall size of the tower or significantly impeding air flow through the shell, all at a cost which is competitive with other types of equipment in light of the capacity of the tower and the space occupied thereby.

In this connection, it is a further important object of the invention to provide a crossflow, hyperbolic, natural draft cooling tower wherein the annular hot water distribution basins and at least the upper cold water basin of the two story fill units are of concrete and integral with the tower shell to not only provide an integrated structure but also serving to greatly stiffen the tower shell in the base area thereof where the most strength is required.

A still further important object of the invention is to provide a crossflow, hyperbolic, natural draft cooling tower wherein ice control is readily accomplished by the simple expedient of controlling the hot water so that an excess is permitted to flow over the intake side of the fill, either around the entire perimeter thereof, or in those areas of the tower which tend to ice because of a particular prevailing wind condition.

Also an important object of the invention is to provide a water cooling tower of the hyperbolic crossflow type wherein the two story fill assembly structure permits separation of the water being circulated in the upper basin from that ciruculated in the lower hot water basin for operation under parameters which produce savings in the pumping cost for many conditions.

Another important object of the invention is to provide a crossflow cooling tower operating on either the natural draft or the mechanical draft principals wherein the fill assemblies are made up of a series of stainless steel grid supports suspended from the overlying hot water distribution structure thereabove and carrying a series of asbestos cement board fill members positioned on edge with the longitudinal axes thereof parallel with the air flow through the fill structures so as to assure efficient air-liquid contact within the fill while at the same time providing a completely fireproof fill assembly which is resistant to physical deterioration.

Another very important object of the invention is to provide a crossflow water cooling tower wherein the entrained water eliminators adjacent the air outlet face of each fill assembly are made up of a series of elongated, vertically spaced, generally horizontally disposed eliminator bars of transversely trough shaped configuration so that by inclining the members longitudinally thereof the eliminator bars are self draining and more effective removal of entrained water from the crossflowing air stream is obtained.

Since structural members within the path of air flow through a cooling tower increase the static pressure drop, it is an important object of the invention to provide a cooling tower as described wherein the corrosion resistant wire fill grids and the asbestos cement board fill members as well as eliminators of the same construction provide minimum impedance to air flow by virtue of the disposition of all fill elements in locations such that the longitudinal axes thereof are parallel with the air flow in the case of the fill members or have side margins facing the air flow path insofar as the eliminators are concerned, thus assuring maximum performance of the tower under widely varying operating conditions.

Other objects and features of the present invention will become apparent or be described in greater detail as the following description progresses.

The hyperbolic, crossflow, natural draft cooling tower 10 illustrated in the drawings is especially adapted for large capacity jobs, as for example where it is necessary to cool hot water and return it to the condensers of a power plant exceeding 1,000 megawatts in output. In this instance, a typical tower shell 12 should have a total effective height of 500 feet or more thus resulting in a base diameter of about 450 feet, a top diameter of almost 350 feet, and a throat diameter approaching 300 feet or more. Shell 12 is fabricated of reinforced concrete carried by an annular array of X-defining reinforced concrete trusses 14 supported by an annular concrete footing. The circular concrete floor 16 of tower 10 extends to the perimeter of trusses 14 and is provided with an inwardly inclined, annular upright wall 18 above footing 21 which cooperates with floor 16 to define a lower cold water basin 20. The trusses 14 are preferably poured integral with the wall 18 to impart increased rigidity and strength to the lower part of tower 10.

Figures 1, 2, 3:
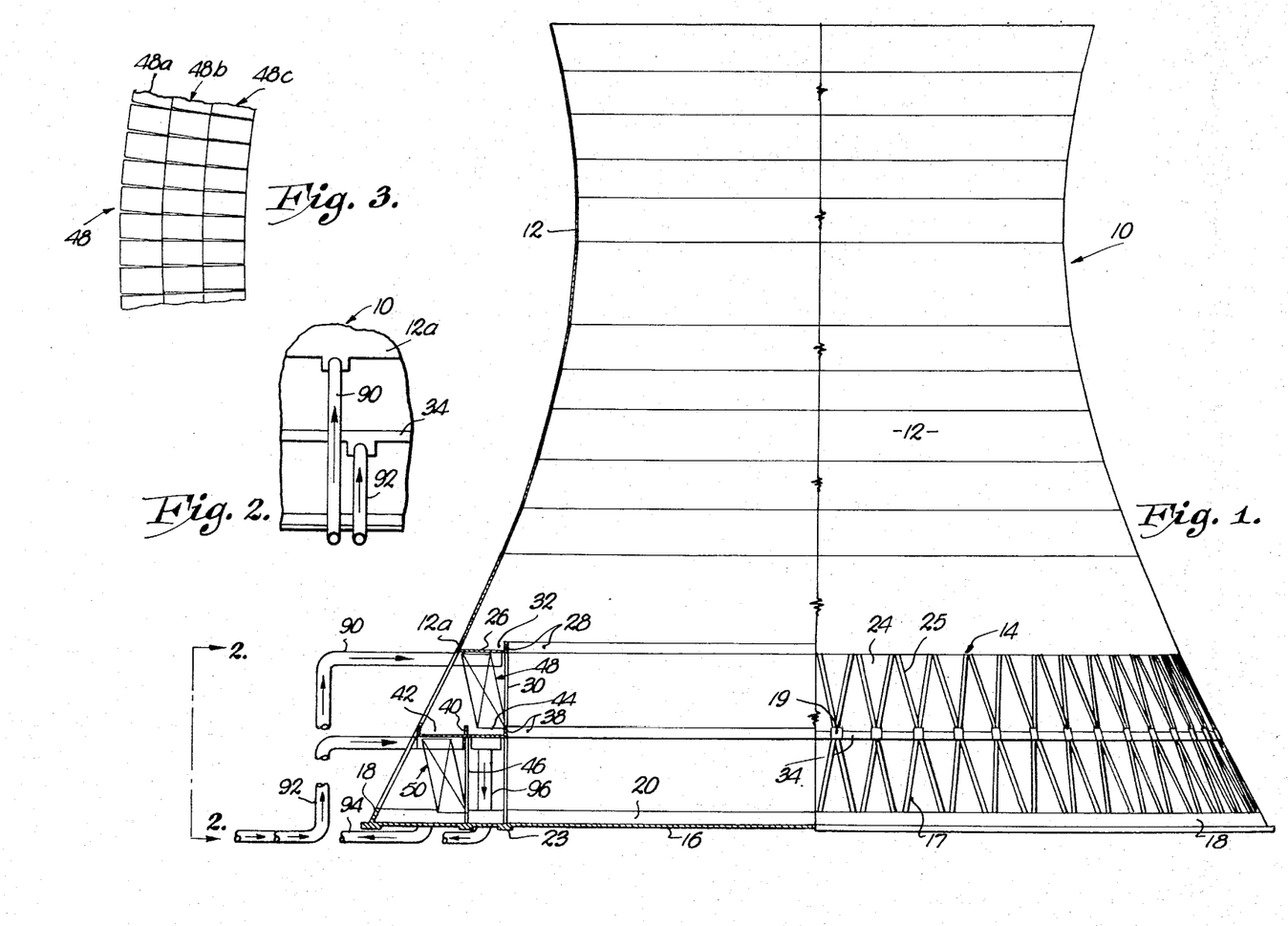
FIG. 1 is a side elevational view of a hyperbolic, natural draft, crossflow cooling tower constructed in accordance with the preferred concepts of the present invention, with the lower left-hand part of the tower being broken away and in section to reveal the position of the fill assembly structure within the shell of the tower, as well as one part of piping for conveying hot water to the distribution basins as well as to return cold water to the source of use thereof.
FIG. 2 is a fragmentary elevational view taken substantially on the line 2—2 of FIG. 1 and looking in the direction of the arrows.
FIG. 3 is an essentially schematic, fragmentary plan view showing the individual fill sections of the upper fill assembly structure and illustrating the normal relative positions of the sections to provide compensation for the annular area occupied thereby within the confines of the cooling tower shell as illustrated in FIG. 1.
Figures 4, 5:
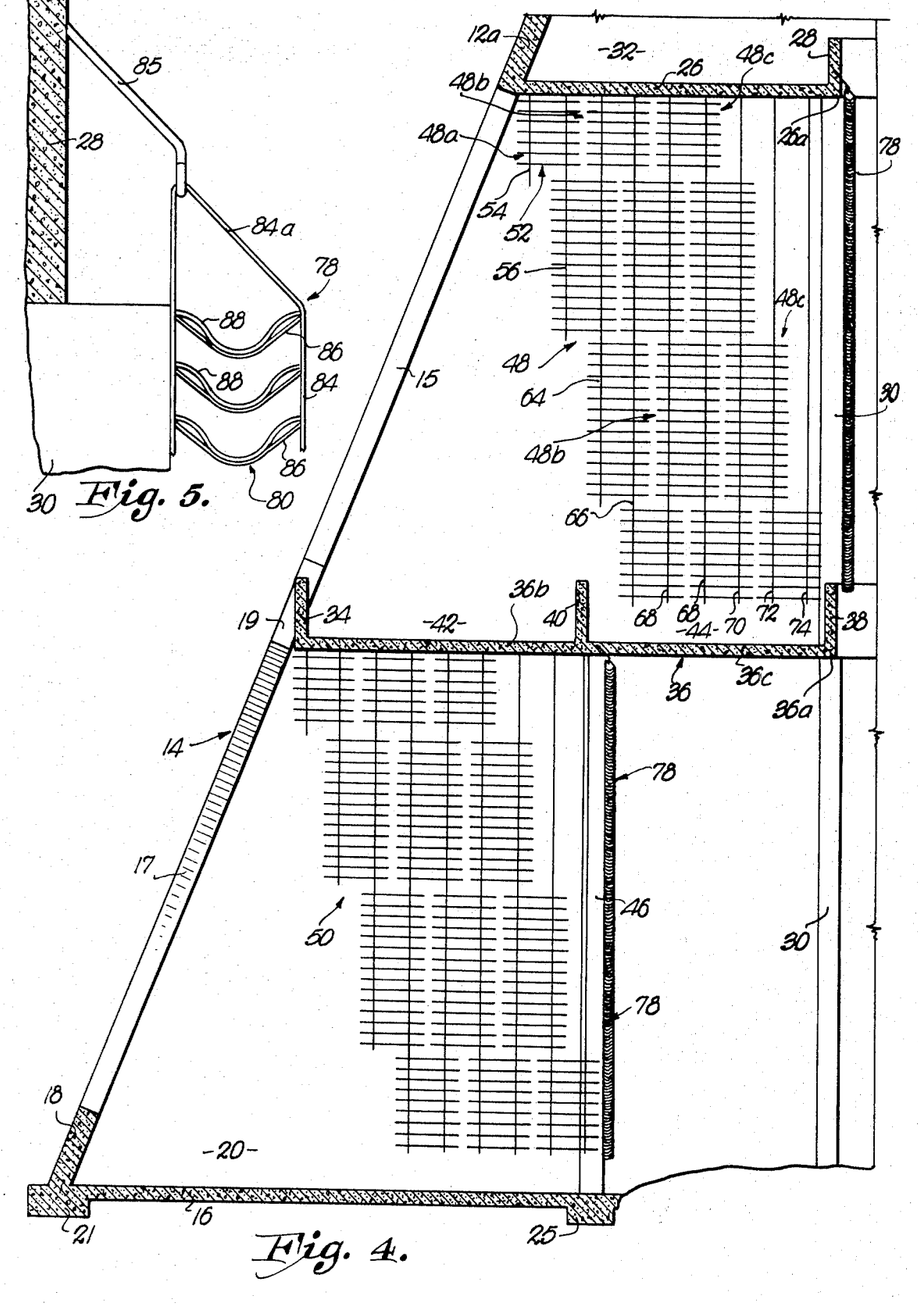
FIG. 4 is an enlarged fragmentary vertical cross-sectional view of the lower left-hand corner of the cooling tower as illustrated in FIG. 1 with the exception that the supply and return pipes are not illustrated for clarity.
FIG. 5 is a fragmentary enlarged generally vertical cross-sectional view illustrating the eliminator structure suspended from the uppermost hot water basin as depicted in FIG. 4.

X-shaped trusses 14 are made up of poured in place upper and lower upright and inverted V-shaped support members 15 and 17 as shown schematically in FIG. 1 which are joined at their apexes by connectors 19. The members 15 and 17 are cooperable to define upper and lower openings respectively which present an annular air inlet 24 for the hyperbolic shell 12. The top of shell 12 is open to present an air discharge outlet. The lower annular marginal portion 12a of shell 12 directly above the air inlet 24 thereof defined by trusses 14 and rigidly secured to the interior surface of shell 12 by a reinforcing steel and the like, serves as the outer support for an annular horizontal concrete floor 26 which is provided with an integral upright circular wall 28 spaced inwardly from shell portion 12a. A series of upright, horizontally spaced structural supports 30 carried by footing 23 within the interior of tower 10 and directly underlying the inner circular margin of floor 26 in direct supporting relationship thereto, are located in an annular pattern within the interior of shell 12 as indicated in FIGS. 1 and 4. The portion 12a of shell 12 and inner circular wall 28 cooperate with floor 26 to present an upper annular hot water basin 32.

A series of longitudinally arcuate, upright reinforced concrete ring segments 34 poured against the upright margins of adjacent connectors 19 forming a part of X-shaped trusses 14 at the zone of merger of the inclined legs thereof as illustrated schematically in FIG. 1, have reinforcing rods and the like common with trusses 14 to provide an integral joinder of ring segments 34 to respective trusses 14. The horizontal, annular reinforced concrete floor 36 joined to the lower margins of ring segments 34 and connectors 19 as well as members 17 has an inner circular margin 36a which is vertically aligned with the inner margin 26a of floor 26. The floor 36 is also carried by the inner, upright structural supports 30 while an inner upright reinforced concrete wall 38 on the floor 36 is disposed in alignment with wall 28 at the inner margin 36a of floor 36. An intermediate, upright circular concrete divider wall 40 integral with floor 36 divides the annular area thereof into an outer hot water distribution basin 42 and an inner cold water collection basin 44. Another annular array of upright structural supports 46 underlying floor 36 in alignment with divider wall 40 are carried by footing 25 below floor 16 and cooperate with supports 30 in carrying basins 42 and 44. It is preferred that the supports 46 be positioned in alignment with corresponding structural supports 30 radially of shell 12.

Fill assembly structures 48 and 50 of annular extent and located between upper hot water basin 32 and the lower cold water basin 44 as well as hot water basin 42 and the lower cold water basin 20 respectively, are made up of a series of corrosion resistant wire grids (for example stainless steel or galvanized wire), which support a series of asbestos cement board fill members 52. Glass fiber reinforced polyester resin grid supports or the equivalent corrosion resistant elements such as polyvinyl resin clad wire may be used in lieu of the wire grids illustrated.

Although not illustrated specifically in the drawings, it is to be understood that the floor 26 of hot water basin 32 as well as the section 36b of floor 36 defining a part of basin 42 are provided with a series of openings therethrough which may or may not have distribution nozzles therein, for permitting hot water from respective basins to flow downwardly onto corresponding fill assembly structures 48 and 50. The section 36c of floor 36 is imperforate except for a plurality of main outlet openings as will be explained.

Figure 6:
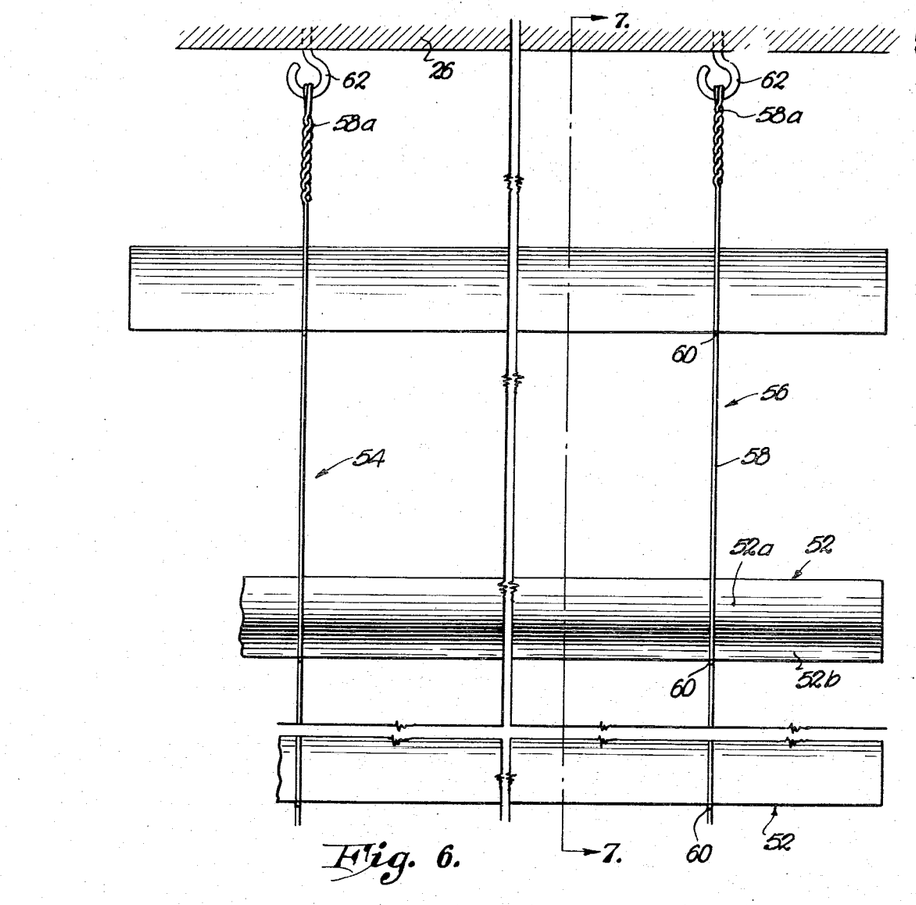
FIG. 6 is an enlarged fragmentary cross-sectional view on the line 6—6 of FIG. 7 of one of the sections of a fill assembly of the cooling tower and showing the way in which the corrosion resistant wire grids are suspended from the basin thereabove while the asbestos cement board fill members are located in essentially upright disposition with the longitudinal axes thereof parallel to the air flow through the fill structure.
Figure 7:
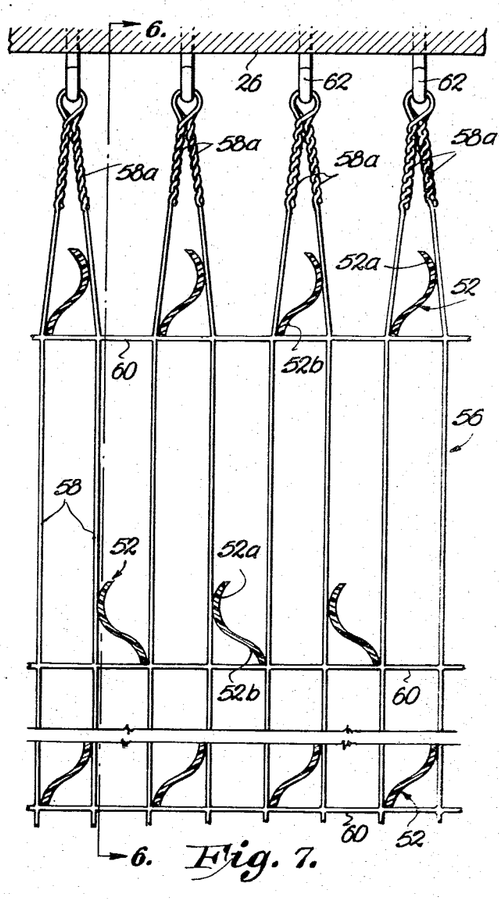
FIG. 7 is a vertical cross-sectional view taken substantially on the line 7—7 of FIG. 6.

As is apparent from FIGS. 4, 6 and 7, the fill structures 46 and 48 are of essentially the same construction and therefore only one of the same requires detailed description. Thus, the fill assembly structure 48 for example is made up of a series of fill sections 48a, b and c as indicated schematically in FIG. 3. Each section 48a, b and c is made up of a number of vertically spaced, transversely S-shaped, three-quarter wave asbestos cement board fill members 52 cut from corrugated sheets and positioned with their longitudinal axes in radial disposition relative to the axis of shell 12 and thereby in parallel relationship to the path of travel of air flowing into tower 10 through the air inlet 24 thereof. Although in the preferred form of fill illustrated, the fill members 52 are parallel with air flow and disposed essentially horizontally, the central longitudinal axial relationship of each member with respect to air flow shold not vary more than about 30° in any direction, from a horizontal line parallel with the air flow and extending through the center of each fill member as defined by the point of intersection of the central longitudinal and transverse axes thereof.

In order to provide compensation for the tendency of water gravitating from corresponding hot water distribution basins 32 and 42 to draw back in the direction of air flow as the bottom of respective fill assembly structures 48 and 50 are approached, the outer annular faces of structures 48 and 50 are stepped back as the cold water basins therebelow are approached as is evident from FIGS. 1 and 4. Thus, referring to the uppermost fill sections 48a, b and c of fill assembly structure 48 immediately below the lower face of wall 26, an outer stainless steel or equivalent grid 54 is suspended from the wall 26 while a longer stainless steel or equivalent grid 56 is carried beneath wall 26 in inwardly spaced relationship from the proximal grid 54. As shown in FIGS. 6 and 7, each of the grids has a series of upright elements 58 crossed by and integral with the horizontal, vertically spaced fill member supporting components 60 which are spaced apart a vertical distance greater than the effective vertical height of corresponding fill members 52 carried thereby. Adjacent pairs of elements 58 are brought together and rewound upon themselves to present eyes 58a for engagement with corresponding hooks 62 embedded in the lower part of floor 26. The space between adjacent horizontal components 60 is preferably of the order of 12 to 14 inches while adjacent vertical elements 58 are spaced from 2 to 2¼ inches apart.

The fill members 52 of the uppermost section 48b are carried by wire grids 64 and 66 of successively greater length while inner grids 68 and 70 of equal length support the fill members 52 of fill section 48c. Three additional grids 72, 74 and 76 spaced radially inwardly of grid 70 support the fill members 52 of sections 48a, b and c below the upper sections which are successively stepped inwardly as is apparent from FIG. 4.

Returning to FIGS. 6 and 7, it is to be noted that the three-quarter wave asbestos cement board fill members 52 are of greater width than the spacing between proximal elements 58 and are located on corresponding components 60 in disposition such that one upper transversely arcuate segment 52a thereof extends in a somewhat vertical direction transversely of the grids 54 and 56 whereas each integral, arcuate segment 52b is in somewhat horizontal disposition. This preferred relationship of segments 52a and 52b with respect to water gravitating from basin 32 onto corresponding fill members, is assured by proper spacing of elements 58 relative to the effective width of each fill member 52. The spacing between elements 58 is carefully designed so that rather than sit directly upright on edge, the fill members 52 lie slightly on their sides at an approximate average slope of about 60° so as to present the generally horizontal area defined by sections 52b serving to act as break-up or splash surfaces as well as the vertical segments 52a which operate as essentially film cooling surfaces. In addition, droplets of water hitting the upwardly facing surface 52b of each fill member 52 are broken up into finer splash droplets and fines which define an essentially fan shaped pattern projecting away from the fill member surface to substantially fill in the concave underside of an adjacent fill member 52 to increase the water cooling efficiency of the fill assembly.

In addition, the fill members 52 of each section 48a, b and c are located in every other horizontal space defined by elements 58 but are vertically offset with respect to adjacent fill members 52 therebelow and immediately above so that the water directed onto sections 48a, b and c from hot water basin 32 must follow a circuitous or serpentine path before reaching cold water collection basin 54 therebelow. The fill members 52 are preferably fabricated from conventional corrugated asbestos cement board of the 42 inch wide, 4.2 inch sine wave, 6 or 8 foot long type which is severed longitudinally of the corrugations to provide the transversely three-quarter wave shape of approximately 3.15 inches width as shown best in FIG. 7. The height of each wave is about 1 1/16 inches.

Adjacent fill segments 48a are in vertically stepped back relationship viewing FIG. 4, a distance approximately equal to one-half the length of corresponding asbestos cement board fill members 52. Compensation is thus provided for the tendency of the water gravitating through fill assembly 48 to draw back in the direction of air travel and thus assuring that substantially all of the fill stays wet for most efficient cooling with a minimum of contact surfaces being required since the rear face of each fill assembly structure 48 is also stepped in a complemental manner to the front face of a respective fill.

As indicated in FIG. 3, the fill sections 48a, 48b and 48c are located generally radially of shell 12 and therefore each section is in slightly greater spaced relationship at the inlet ends thereof than is the case at the inner extremities of the same.

Drift eliminator structure 78 is provided for each of the fill assembly structures 48 and 50 to remove droplets of water entrained in the air emerging from the rear faces of corresponding fill structures 48 and 50. Each eliminator 78 is made up of a plurality of vertical, horizontally spaced eliminator bar support grid units 80 of stainless steel, polyvinyl-clad wire, or fiber glass reinforced polyester resin. The upright, horizontally spaced wire or equivalent elements 82 and 84 of each grid 80 are joined by an upper inclined section 84a of each element 84. Grid units 80 are preferably suspended from J-shaped hooks 85 embedded in the vertical inner face of wall 28 in the case of the upper eliminator 78, or the lower surface of wall 36 inboard of divider wall 40 with respect to the lower drift eliminator 78. The horizontal, vertically spaced support elements 86 integral with elements 82 and 84 respectively serve as means for carrying a series of vertically aligned, transversely arcuate, generally horizontal, drift eliminator bars 88 of asbestos cement board which are tilted slightly longitudinally thereof for drainage. The angle of inclination of bars 88 is preferably about 1 inch drop for each 12 inches of longitudinal length thereof. Each bar 88 is preferably cut from conventional 42 inch wide, 177 mm wave asbestos cement corrugated boards 6 or 8 feet long so that each bar 88 is of transversely full wave shape to effect efficient scrubbing of air passing thereacross while at the same time presenting a water drain trough and possessed with sufficient inherent structural strength to span a considerable horizontal space between adjacent units 80. The effective vertical height of each wave is about 2 ⅛ inches.

Each of the drift eliminator structures 78 extends downwardly a sufficient distance to overlap the entire upright rear face of corresponding fill assemblies 48 and 50. The structural supports 30 and 46 serve to stabilize the drift eliminators 78 as shown in FIGS. 4 by virtue of the fact that the inner upright elements 82 of each grid 80 rest against the innermost vertical surface of corresponding structural supports. Although shown in upright disposition, it is to be understood that the drift eliminators 78 may be inclined in a direction complemental to the inclined inner faces of fill structures 48 and 50, if desired. Similarly, horizontal, intermediate concrete support bars for grids 56 and 64–74 may be provided if desired where the vertical length of the grids is such as to present a problem of the amount of water and fill member loading that may be safely placed thereon.

Figure 8:
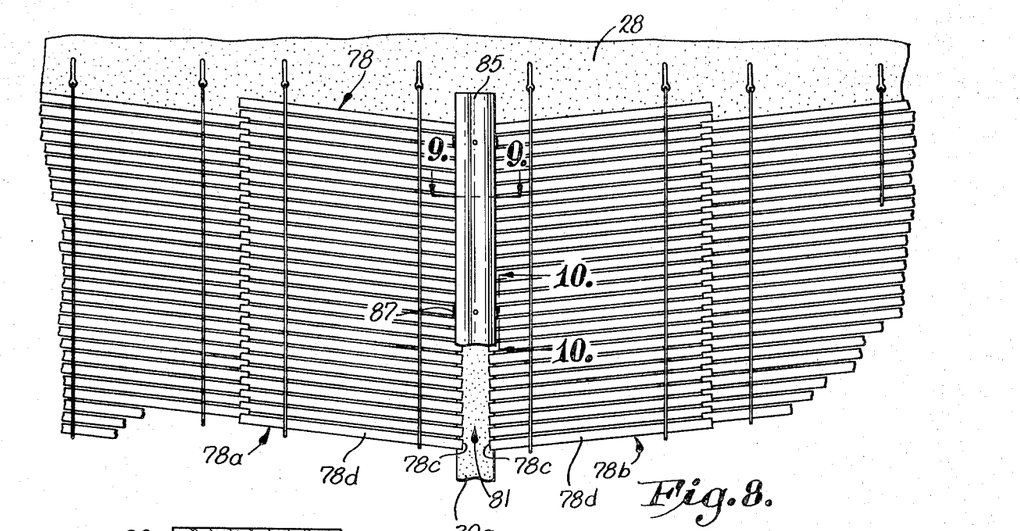
FIG. 8 is a fragmentary elevational view of the eliminator structure shown in FIGS. 4 and 5, with portions thereof being broken away to better illustrate the details of construction of the components.
Figure 9:
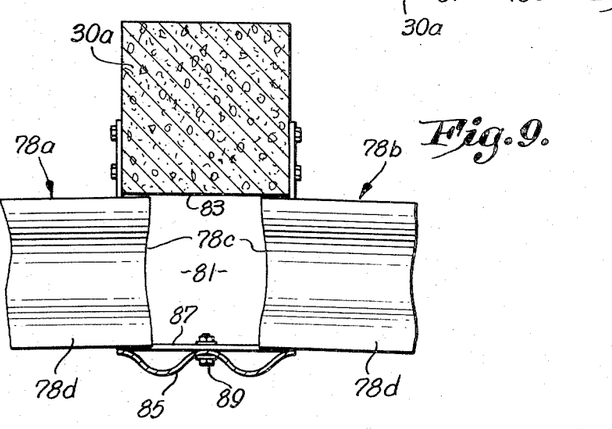
FIGS. 9 and 10 are fragmentary cross sectional views taken on the lines 9—9 and 10—10 respectively of FIG. 8.
Figure 10:
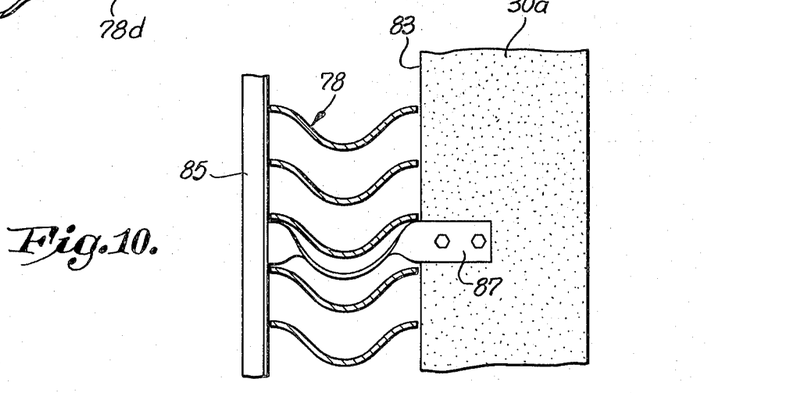

As is best shown in FIG. 8, certain vertical rows 78a of the eliminator bars 78 are tilted in one direction longitudinally thereof, while adjacent rows 78b are longitudinally tilted in the opposite direction so that the eliminators drain toward a common vertical space 81 therebetween. Longitudinally aligned bars 78 in each of the rows 78a and 78b are positioned with adjacent ends thereof in overlapping relationship while the lowermost ends 78c of the eliminator bars 78d which terminate at space 81 are in hroizontally spaced relationship. Preferably, ends 78c overlap an upright structural column such as column 30a which thereby has an upright surface 83 which serves as one side of the drain chute presented by space 81. The opposite side of the drain chute is defined by upright panel 85 of corrugated asbestos cement board held in position against the ends 78d of bars 78 by U-shaped brackets 87 fastened to opposed sides of column 30a. Fasteners 89 join the panel 85 to respective brackets 87.

One or more hot water supply pipes 90 and 92 communicate with the basins 32 and 42 respectively through conventional flume structure as shown in FIGS. 1 and 2 while one or more cold water return pipes 94 and 96 also lead from basins 20 and 44 to a point of use of the water.

In the operation of tower 10, hot water to be cooled is introduced into distribution basins 32 and 42 via supply pipes 90 and 92 whereupon the water is permitted to gravitate through the orifices in corresponding floors 26 and 36b onto the upper faces of sections 48a, b and c of the fill assembly structures 48 and 50 therebelow. Impingement of the hot water against fill members 52 causes the water to be broken up to a certain extent while a part of the water forms a film on opposed surfaces of segments 52a and 52b for cooling thereby as air is pulled inwardly through inlet 24 and caused to move essentially horizontally through fill assembly structures 48 and 50 by virtue of the natural draft induced by shell 12 of tower 10. Any droplets of water entrained in the air as it emerges from the inner faces of fill assembly structures 48 and 50 is removed from the air by the scrubbing action produced by eliminator bars 88 of drift eliminators 78. The transversely arcuate shape of the bars 88 imparts some turbulence to the air to effectively remove droplets of water from the hot air without producing a deleterious static pressure drop. By virtue of the trough shaped configuration of bars 88 and overlapping of adjacent bars, water collecting on the upper surfaces thereof drains longitudinally of corresponding rows 78a and 78b of eliminators and is received in respective drain chutes defined by spaces 81 for ultimate gravitation to the cold water basin therebelow.

In designing a hyperbolic, natural draft cooling tower of optimum characteristics from an operational well as economic standpoint, it is necessary to determine the most efficient interrelationship of stack height and diameter, fill volume and total air inlet area thereof which is capable of handling the amount of water to be cooled from the high temperature encountered to the low temperature required for a particular installation, and taking into account not only the cost of the tower itself but also the operating costs thereof. Studies have shown that when the factors above are properly balanced, the hot air discharge velocity from the top of the stack will be approximately within the range of 800 to 1,000 feet per minute. A velocity of this magnitude can be obtained with an economically sized tower shell only when the dynamic pressure losses and resistance to flow of air in the shell are not excessive.

A hyperbolic tower having two story integrated basin and fill structure as described above uniquely meets the desired design requirements of permitting construction of a shell of an economical size for the rated capacity thereof wherein a hot air discharge velocity of a preferred value may be obtained by virtue of the fact that the fill does not impair air flow therethrough to an excessive extent while at the same time providing capacity for cooling a relatively large volume of water on a gallon per minute basis because of the double story nature of the fill.

In addition, the use of elongated fill members 52 which are positioned with their longitudinal axes in parallel relationship to the cross flowing air moving through corresponding fill assembly structures 48 and 50, produces efficient cooling of the water without adversely affecting air velocity through the fill itself. This is especially true by virtue of the fact that minimum fill bar area is exposed to the cross flowing air as an impediment to movement thereof. All of the above advantages are obtained without the necessity of disposing the fill assembly around the outside perimeter of the tower as has heretofore been required, and at the same time producing a completely fireproof construction. The use of concrete for fabricating the shell as well as the distribution and collection basins is an advantage not only from the standpoint of being flameproof, but also because of the structural strength of this material when suitably reinforced. Stainless steel or equivalent glass reinforced resin fill and eliminator grids as well as asbestos cement board fill members and eliminator bars permits elimination of all materials from the tower which can burn or sustain a flame.

In past crossflow, hyperbolic, natural draft towers where the fill structure was disposed around the periphery of the tower, it was necessary to provide inlet louvers around the fill to contain water gravitating through the fill structures and avoid excessive splash out from the tower. Although concrete is generally considered a suitable material for constructing cooling towers, especially those of the hyperbolic natural draft type, the construction of inlet louvers of concrete would excessively add to the cost of the tower. However, in the present tower this problem has been avoided by virtue of extension of the cold water basin outwardly to the circular margin of the base of the shell 12 thus eliminating the need for inlet louvers because of the stepped back configuration of the fill structures 48 and 50 with respect to the frustoconical base portion of shell 12. Ice control in this connection may be readily accomplished by providing excessive water on the intake face of each fill assembly structure 48 and 50. Similarly, added water may be directed to that part of the tower which tends to ice under a given wind condition, so long as radial dividers are provided for basins 32 and 42 to permit selective direction of water to circumferentially spaced sections around the base of the shell 12.

Not only does the shell 12 and support trusses 14 serve to assist in the support of the upper and lower water distribution basins as well as the upper cold water collection basin, but these annular concrete structural components also in turn greatly stiffen the shell. This is particularly important in a tower of the size contemplated by this design. Additionally, the hot water distribution basins 32 and 42 serve as a support for the fill assembly structures 48 and 50 as well as the eliminators 78 and provide a flume to distribute the hot water around the tower. The hot water basins can thereby be designed for most practical water flows under varying use conditions.

Although fill assemblies 52 and eliminator structure 78 has been shown as forming an operating part of a natural draft, hyperbolic cross flow cooling tower, it is to be understood that these assemblies have equal utility used singly or in combination in a mechanical induced or direct draft cross flow water cooling tower and particularly those of the large capacity, industrial type.

Having thus described the invention, what is claimed as new and desired to be secured by Letters Patent is:

1. For use with a cross flow water cooling tower having a hot water distributor, a cold water basin therebelow, and means for inducing crossflow movement of air therebetween, the combination therewith of splash type fill assembly structure comprising:
   a series of elongated fill members; and
   means supporting the fill members in the space between the hot water distributor and said cold water basin in horizontally and vertically spaced relationship,
   said fill members being located in relative offset relationship with respect to members thereabove or therebelow in disposition to provide water intercepting, upwardly facing splash surfaces therough-out substantially the entire plan area of the fill assembly structure, and
   each of the fill members being positioned in a location causing the longitudinal axis thereof to be within 30° in all directions of a horizontal line generally parallel with the path of crossflowing air through said fill assembly structure.

2. Spalsh type fill assembly structure as set forth in claim 1 wherein said means for supporting the fill members comprises a plurality of upright grids located in planes generally perpendicular to the path of crossflowing air through mid space receiving the full assembly structure.

3. Spalsh type fill assembly structure as set forth in claim 1 wherein each of said fill members has a nonplanar, upwardly facing splash surface.

4. Splash type fill assembly structure as set forth in claim 3 wherein each of said fill members is of transversely arcuate configuration defining at least part of a sine wave.

5. Splash type fill assembly structure as set forth in claim 4 wherein each of said fill members is of transversely arcuate configuration defining about three fourths of a sine wave.

6. Splash type fill assembly structure as set forth in claim 3 wherein each of said fill members is of transversely arcuate, serpentine configuration and located with the transverse axes thereof in angular relationship with respect to the horizontal.

7. Splash type fill assembly structure as set forth in claim 6 wherein each of said fill members is approximately three inches in width, said members being spaced apart about 2 inches horizontally and approximately 12 to 14 inches vertically.

8. Splash type fill assembly structure as set forth in claim 6 wherein the distance horizontally between adjacent, horizontally spaced fill members is approximately equal to the effective transverse width of each fill member in the inclined location thereof, the fill members in adjacent vertically spaced horizontal rows being offset from the fill members immediately thereabove and next therebelow.

9. Splash type fill assembly structure as set forth in claim 6 wherein said fill members are positioned with the transverse axes thereof in inclined relationship with respect to both the vertical and the horizontal.

10. Splash type fill assembly structure as set forth in claim 9 wherein the fill members in one horizontal row are inclined transversely thereof in one direction and the fill members in the next adjacent horizontal row are inclined transversely thereof in the opposite direction.

* * * * *